United States Patent
Morita et al.

(10) Patent No.: US 10,680,215 B2
(45) Date of Patent: Jun. 9, 2020

(54) SECONDARY BATTERY AND ASSEMBLED BATTERY

(75) Inventors: Masahiro Morita, Nisshin (JP); Hiroki Nagai, Nagoya (JP); Satomi Kawase, Miyoshi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 570 days.

(21) Appl. No.: 13/984,868

(22) PCT Filed: Feb. 14, 2011

(86) PCT No.: PCT/JP2011/053058
§ 371 (c)(1),
(2), (4) Date: Aug. 12, 2013

(87) PCT Pub. No.: WO2012/111077
PCT Pub. Date: Aug. 23, 2012

(65) Prior Publication Data
US 2013/0316210 A1    Nov. 28, 2013

(51) Int. Cl.
*H01M 2/02*    (2006.01)
*H01M 2/10*    (2006.01)
(Continued)

(52) U.S. Cl.
CPC ......... *H01M 2/1077* (2013.01); *H01M 2/024* (2013.01); *H01M 2/0245* (2013.01);
(Continued)

(58) Field of Classification Search
CPC .. H01M 2/024; H01M 2/0245; H01M 2/1077; H01M 4/505; H01M 4/525;
(Continued)

(56) References Cited

U.S. PATENT DOCUMENTS 6,761,992 B1 *  7/2004  Marukawa ......... H01M 2/1077
                                                429/159
7,060,116 B2 *  6/2006  Marukawa ......... H01M 2/0257
                                                29/623.1

(Continued)

FOREIGN PATENT DOCUMENTS

CN    101765932 A     6/2010
JP    2003-203630     7/2003
(Continued)

*Primary Examiner* — Jonathan Crepeau
*Assistant Examiner* — Angela Martin
(74) *Attorney, Agent, or Firm* — Finnegan, Henderson, Farabow, Garrett & Dunner, LLP

(57) ABSTRACT

An assembled battery (10) according to the present invention is constructed by connecting a plurality of chargeable and dischargeable cells (12) in series, this assembled battery (10) including a plurality of cells (12), each cell (12) including a flat-shaped electrode body (80) which has a positive electrode and a negative electrode and a container (14) which houses the electrode body (80) and an electrolyte, wherein the plurality of cells (12) are constrained in a state where the cells (12) are aligned so that flat surfaces of the electrode bodies (80) oppose each other and a load is applied to the cells (12) in an array direction, and a spring constant of the electrode body (80) in the array direction in each of the constrained cells (12) is 10,000 kgf/mm or less.

15 Claims, 10 Drawing Sheets

DIRECTION OF ALIGNMENT

(51) Int. Cl.
  *H01M 4/50*     (2010.01)
  *H01M 4/52*     (2010.01)
  *H01M 10/05*    (2010.01)
  *H01M 4/13*     (2010.01)
  *H01M 4/505*    (2010.01)
  *H01M 4/525*    (2010.01)
  *H01M 10/052*   (2010.01)
  *H01M 4/131*    (2010.01)
  *H01M 10/0587*  (2010.01)
  *H01M 4/02*     (2006.01)

(52) U.S. Cl.
  CPC .......... *H01M 4/131* (2013.01); *H01M 4/505* (2013.01); *H01M 4/525* (2013.01); *H01M 10/052* (2013.01); *H01M 10/0587* (2013.01); *H01M 2004/021* (2013.01); *Y02T 10/7011* (2013.01)

(58) Field of Classification Search
  CPC ............ H01M 4/131; H01M 10/052; H01M 10/0587; H01M 2004/021
  See application file for complete search history.

(56) References Cited

U.S. PATENT DOCUMENTS

| | | | | |
|---|---|---|---|---|
| 2003/0054239 A1* | 3/2003 | Watanabe | ........... | H01M 2/1072 429/152 |
| 2003/0162091 A1* | 8/2003 | Watanabe | ........... | H01M 2/0262 429/156 |
| 2004/0091771 A1* | 5/2004 | Hosaka | ........... | H01M 2/08 429/185 |
| 2007/0190404 A1 | 8/2007 | Hatanaka et al. | | |
| 2009/0305104 A1* | 12/2009 | Matsumoto | ........ | H01M 8/0273 429/434 |
| 2010/0099023 A1* | 4/2010 | Kuroda | ........... | H01M 2/0245 429/159 |
| 2010/0112424 A1* | 5/2010 | Hayashi | ........... | H01M 2/1077 429/99 |
| 2010/0136461 A1* | 6/2010 | Tsujiko | ........... | H01M 2/0245 429/512 |
| 2010/0190049 A1* | 7/2010 | Kawase | ........... | H01M 2/1077 429/159 |
| 2010/0233525 A1 | 9/2010 | Kaiduka et al. | | |
| 2011/0177377 A1* | 7/2011 | Dube | ........... | H01M 2/0207 429/153 |
| 2011/0177398 A1* | 7/2011 | Affinito | ........... | H01M 4/134 429/325 |
| 2011/0223462 A1 | 9/2011 | Kim et al. | | |

FOREIGN PATENT DOCUMENTS

| | | | | |
|---|---|---|---|---|
| JP | 2006-278184 | * | 10/2006 | |
| JP | 2007-48750 | | 2/2007 | |
| JP | 2007-188864 | * | 7/2007 | ............ H01M 4/36 |
| JP | 2007-200795 | * | 8/2007 | ............ H01M 4/02 |
| JP | 2010-31214 | | 2/2010 | |
| JP | 2010-212086 | | 9/2010 | |
| JP | 2010-267463 | | 11/2010 | |
| WO | WO 2009/014071 A1 | * | 1/2009 | ........... H01M 10/04 |
| WO | WO 2012/063370 A1 | | 5/2012 | |

\* cited by examiner

DIRECTION OF ALIGNMENT

SECONDARY BATTERY AND ASSEMBLED BATTERY

CROSS-REFERENCE TO RELATED APPLICATIONS

This application is a national phase application of International Application No. PCT/JP2011/053058, filed Feb. 14, 2011, the content of which is incorporated herein by reference.

TECHNICAL FIELD

The present invention relates to a secondary battery and an assembled battery constructed by connecting a plurality of secondary batteries in series.

BACKGROUND ART

In recent years, lithium secondary batteries, nickel-hydride batteries, and other secondary batteries are growing in importance as vehicle-mounted power supplies and as power supplies for personal computers and mobile phones. In particular, since lithium secondary batteries (typically, lithium ion batteries) are lightweight and allow manufacturing of high energy density, they are expected to be preferably used as high-output power source, vehicle-mounted power supplies.

With such lithium secondary batteries, expansion and contraction occurs at plates (positive electrode and negative electrode) in an electrode body due to charge and discharge in other words, fluctuations in a state of charge (SOC)), temperature variations, and the like. When a distance between plates increases, since electron conductivity in a positive electrode active material layer and a negative electrode active material layer declines, internal resistance rises and battery performance deteriorates. Therefore, with an assembled battery in which a plurality of lithium secondary batteries are laminated, pressure is desirably applied to individual cells that constitute the assembled battery in order to prevent the distance between plates from increasing.

In a battery module (assembled battery) described in Patent Literature 1, a pair of end plates is installed on outermost sides (either end) of a group of cells aligned in a direction of lamination of the cells and the pair of end plates is tightened and fixed in a direction in which the end plates approach each other in order to apply pressure (load) to each cell. In other words, with a conventional assembled battery, appropriate pressure is applied to each cell by bringing the respective cells into pressure contact with each other so that a length of the aligned group of cells (hereinafter, also referred to as a "cell laminate") becomes equal to a prescribed length.

CITATION LIST

Patent Literature

Patent Literature 1: Japanese Patent Application Publication No. 2007-048750

SUMMARY OF INVENTION

However, with constraint created by tightening of the end plates, even if appropriate pressure is applied at the time of manufacturing to each cell (typically, mainly to an electrode body that constitutes the cell) by bringing the respective cells into pressure contact with each other so that a length of the aligned group of cells (the cell laminate) becomes equal to a prescribed length, a problem occurs when used over a long period of time in that a deterioration of constraining members or the like causes a variation in the length of the cell laminate which, in turn, causes pressure applied to each cell to fluctuate. In particular, since an assembled battery to be mounted in a vehicle such as an automobile (typically, an assembled battery for a vehicle drive source) is often used in a state where temperature varies dynamically and vibrations occur, constraining members are more likely to deteriorate and a fluctuation in the pressure is likely to occur.

The present invention has been made in consideration of the above, and a main object of the present invention is to provide an assembled battery capable of stably maintaining pressure acting on each cell (typically, mainly on an electrode body that constitutes the cell) and a battery which may be mounted to the assembled battery.

The assembled battery according to the present invention is constructed by connecting a plurality of Chargeable and dischargeable cells in series. The assembled battery comprises a plurality of cells, wherein each cell includes a flat-shaped electrode body which has a positive electrode and a negative electrode and a container which houses the electrode body and an electrolyte. The plurality of cells are constrained in a state where the cells are aligned so that flat surfaces of the electrode bodies oppose each other and where a load is applied to the cells in an array direction. A spring constant of the electrode body in the array direction in each of the constrained cells is 10,000 kgf/mm or less.

Moreover, a "spring constant of an electrode body" as used in the present specification refers to a proportionality constant obtained by dividing a load applied to the electrode body by displacement. Specifically, the spring constant can be obtained according to Expression (1) below by reading a displacement X due to compression (typically, elastic deformation) which occurs when a load P (kgf: 1 kgf=approximately 9.8 N) is applied to a flat surface of the electrode body.

$$\text{Spring constant } k \text{ (kgf/mm)} = P(\text{kgf})/X \text{ (mm)} \qquad (1)$$

In addition, a "cell" as used in the present specification refers to an individual electricity-storing element which may be connected in series with one another in order to construct an assembled battery and, unless otherwise noted, encompasses batteries and capacitors with various compositions. Furthermore, a "secondary battery" refers to batteries in general which can be repetitively charged and encompasses so-called storage batteries including lithium-ion secondary batteries and nickel-hydride batteries. An electricity-storing element which constitutes a lithium-ion secondary battery is a typical example of a "cell" as used herein, and a lithium-ion secondary battery module constructed by a plurality of such cells is a typical example of an "assembled battery" as disclosed herein.

According to the configuration of the present invention, in an assembled battery in which a plurality of cells are aligned so that flat surfaces of electrode bodies oppose each other and which is constrained in a state where a load is applied in an array direction, a spring constant of the electrode body with respect to the array direction (direction the load) is equal to or lower than 10,000 kgf/mm (for example, 2000 kgf/mm to 10,000 kgf/mm) and particularly favorably equal to or lower than 6000 kgf/mm (for example, 2000 kgf/mm to 6000 kgf/mm).

An assembled battery comprising an electrode body satisfying the condition described above is capable of stably maintaining pressure acting on each cell (typically, mainly on an electrode body that constitutes the cell) even when deterioration of constraining members or the like causes a variation in the length of the cell laminate. Therefore, even during use over a long period of time, the pressure acting on each cell (typically, mainly to a wound electrode body that constitutes the cell) can be appropriately maintained and battery performance (in particular, output characteristics) can be favorably maintained.

The spring constant of the electrode body with respect to the direction of cell alignment (load direction) appropriately ranges from approximately 2000 kgf/mm to 10,000 kgf/mm, favorably ranges from 2000 kgf/mm to 8000 kgf/mm, and particularly favorably ranges from 2000 kgf/mm to 6000 kgf/mm. An assembled battery in which the spring constant of the electrode body exceeds 10,000 kgf/mm may not always be capable of stably maintaining pressure acting on each cell (typically, mainly on an electrode body that constitutes the cell) when deterioration of constraining members or the like causes a variation in the length of the cell laminate. On the other hand, an assembled battery in which the spring constant of the electrode body is below 2000 kgf/mm is unfavorable because such an assembled battery is difficult to manufacture and reduced dimensional stability of plates (positive electrode and negative electrode) and the electrode body causes a decline in durability. In reality, a sufficiently preferable performance can be produced if the spring constant of the electrode body with respect to the array direction (the load direction) ranges from 5000 kgf/mm to 10,000 kgf/mm.

In a favorable aspect of the assembled battery disclosed herein, the electrode body comprises a positive electrode constructed by adding a positive electrode active material layer including a positive electrode active material to a positive electrode current collector, wherein the positive electrode active material layer has a porosity of 30% to 60%. When the porosity is within this range, a soft positive electrode with superior elasticity can be produced. Therefore, a wound electrode body whose spring constant satisfies the preferred range described above can be more appropriately obtained.

Favorably, the positive electrode active material has secondary particles formed by the aggregation of a plurality of primary particles of a lithium transition metal oxide, and a hollow portion formed in the secondary particles. According to this configuration, a positive electrode active material layer having an optimal porosity (for example, 30% to 60%, more favorably 40% to 60%, and particularly favorably 50% to 60%) can be formed more readily. The positive electrode active material may be a lithium transition metal oxide which has a layered structure and which contains nickel, cobalt, and manganese as structural elements. In addition, the positive electrode active material layer may include an electrically conductive material. In this case, a content ratio of the electrically conductive material in the positive electrode active material layer is favorably equal to or higher than 8% by mass. When the content ratio of the electrically conductive material is within this range, a soft positive electrode with superior elasticity can be produced. Therefore, a wound electrode body whose spring constant satisfies the preferred range described above can be more appropriately obtained.

In a favorable aspect of the assembled battery disclosed herein, the electrode body comprises a negative electrode constructed by adding a negative electrode active material layer including a negative electrode active material to a negative electrode current collector, wherein the negative electrode active material layer has a porosity of 30% to 60%. When the porosity is within this range, a soft negative electrode with superior elasticity can be produced. Therefore, a wound electrode body whose spring constant satisfies the preferred range described above can be more appropriately obtained.

In a favorable aspect of the assembled battery disclosed herein, the electrode body is a flat-shaped wound electrode body which is constructed by winding, via, a separator, a positive electrode in which a positive electrode active material layer is added to an elongated sheet-shaped positive electrode current collector and a negative electrode in which a negative electrode active material layer is added to an elongated sheet-shaped negative electrode current collector. With an assembled battery in which a plurality of cells comprising the wound electrode body are aligned and constrained in an array direction, a decline in performance is likely to occur due to a fluctuation in pressure (constraint pressure). Therefore, applying the present invention is particularly useful.

In addition, as another aspect of the present invention which achieves the object described above, the present invention provides a secondary battery which can be preferably mounted to the assembled battery. In other words, the secondary battery disclosed herein comprises a flat-shaped electrode body to which a constraint load is applied from outside of a battery container, wherein a spring constant of the electrode body in a load direction is equal to or lower than 10,000 kgf/mm. According to this configuration, with an assembled battery constructed by aligning a plurality of the secondary batteries and constraining the secondary batteries in an array direction, pressure acting on each battery can be stably maintained.

Favorably, the electrode body comprises a positive electrode constructed by adding a positive electrode active material layer including a positive electrode active material to a positive electrode current collector, wherein the positive electrode active material layer has a porosity of 30% to 60%. The positive electrode active material may have secondary particles formed by the aggregation of a plurality of primary particles of a lithium transition metal oxide, and a hollow portion formed in the secondary particles. In addition, the positive electrode active material may be a lithium transition metal oxide which has a layered structure and which contains nickel, cobalt, and manganese as structural elements. Furthermore, the positive electrode active material may include an electrically conductive material and a content ratio of the electrically conductive material in the positive electrode active material layer may be equal to or higher than 8% by mass. In addition, favorably, the electrode body comprises a negative electrode constructed by adding a negative electrode active material layer including a negative electrode active material to a negative electrode current collector, wherein the negative electrode active material layer has a porosity of 30% to 60%.

Since any of the assembled batteries disclosed herein is capable of stably maintaining pressure that acts on each cell even when used in a state where temperature varies dynamically and vibrations occur, performance that is suitable as an assembled battery to be mounted in a vehicle can be produced. As such, the present invention provides a vehicle comprising the assembled battery disclosed herein. In particular, a vehicle (for example, an automobile) comprising the assembly battery as a power source (typically, a power source of a hybrid vehicle or an electric vehicle) is provided.

DESCRIPTION OF EMBODIMENTS

The following provides a description of a preferred embodiment of the present invention. It should be noted that matters other than those specifically mentioned in the present specification (for example, a structure of a cell that is a component of an assembled battery) which are nevertheless necessary for the implementation of the present invention (for example, a configuration and a method of manufacturing a positive electrode, a negative electrode, and a separator, a method of constraining a cell, or a method of mounting an assembled battery to a vehicle) can be construed as design items for a person skilled in the art on the basis of prior art in the relevant field. The present invention can be carried out based on the contents disclosed in the present specification and on common general technical knowledge in the relevant field.

Figure 11:
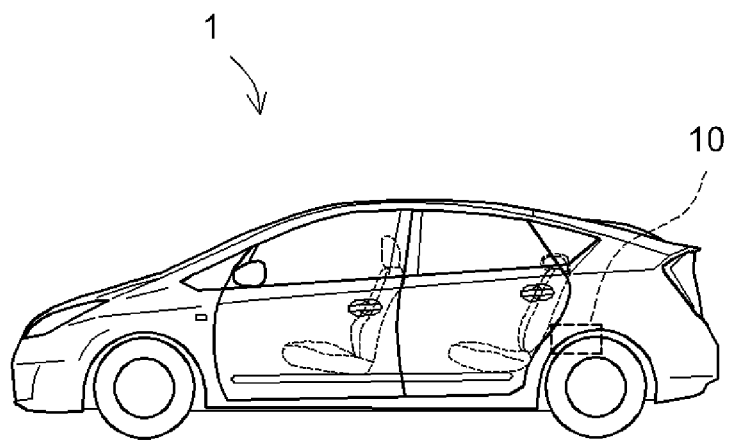
FIG. 11 is a side view schematically showing a vehicle (automobile) comprising an assembled battery according to an embodiment of the present invention.

An assembled battery according to the present invention can particularly be preferably used as a vehicle-driving power source (a power source for a motor (electric motor)) to be mounted to a vehicle such as an automobile. Therefore, as schematically shown in FIG. 11, the present invention provides a vehicle (typically, an automobile, and more particularly an automobile comprising an electric motor such as a hybrid automobile, an electric automobile, and a fuel-cell powered automobile) 1 comprising an assembled battery 10 according to the present invention as a power source.

The assembled battery disclosed herein need only be an assembled battery constructed by aligning cells (typically, cells with a flat-shaped exterior) and constraining the cells in an array direction (direction of lamination), and the cells are not limited to any particular type. Preferable cells for implementing the present invention include a nickel-hydride battery and an electric double-layer capacitor. A cell that is particularly preferable for implementing the present invention is a lithium-ion secondary battery. Since the lithium-ion secondary battery is a secondary battery capable of realizing high output at high energy density, a high-performance assembled battery and, particularly, a high-performance vehicle-mounted assembled battery (battery module) can be constructed.

The present invention will be described in detail below using an example of an assembled battery which uses a flat-shaped lithium-ion secondary battery as a cell and which is constructed by connecting a plurality of the cells in series. However, the example is not intended to limit the present invention thereto.

The cell used as a component of the assembled battery according to the embodiment described below may be similar to a cell that is built into a typical assembled battery with the exception of a configuration of a wound electrode body 80 (to be described later), and typically comprises a wound electrode body having predetermined battery constituent materials (respective active materials for positive and negative electrodes, respective current collectors for the positive and negative electrodes, a separator, and the like) and a container which houses the wound electrode body and a suitable electrolyte.

Figure 1:
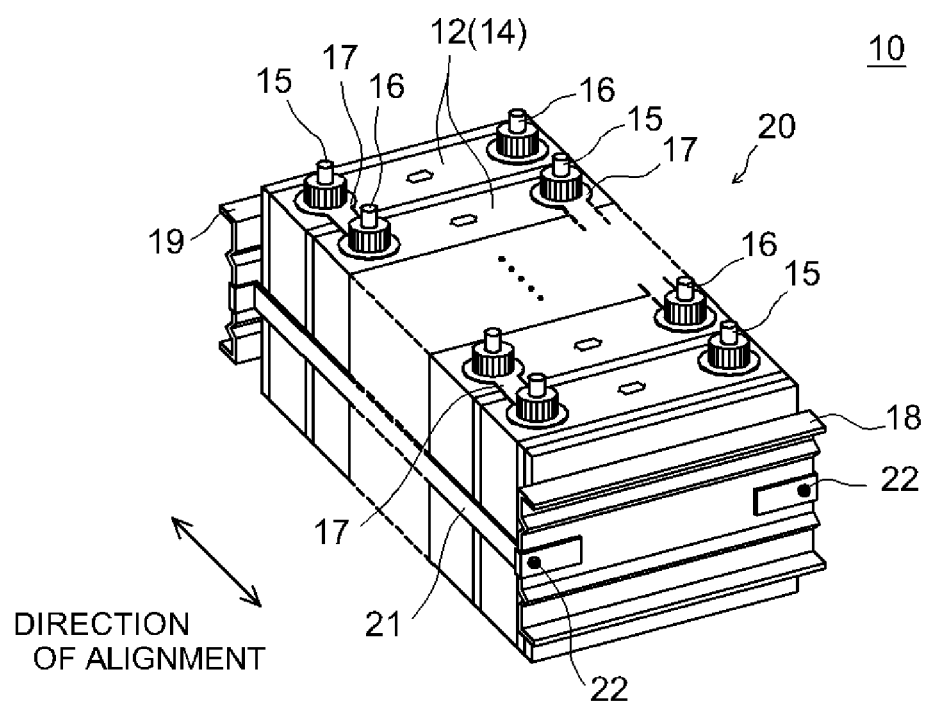
FIG. 1 is a perspective view schematically showing a configuration of an assembled battery according to an embodiment of the present invention.
Figure 2:
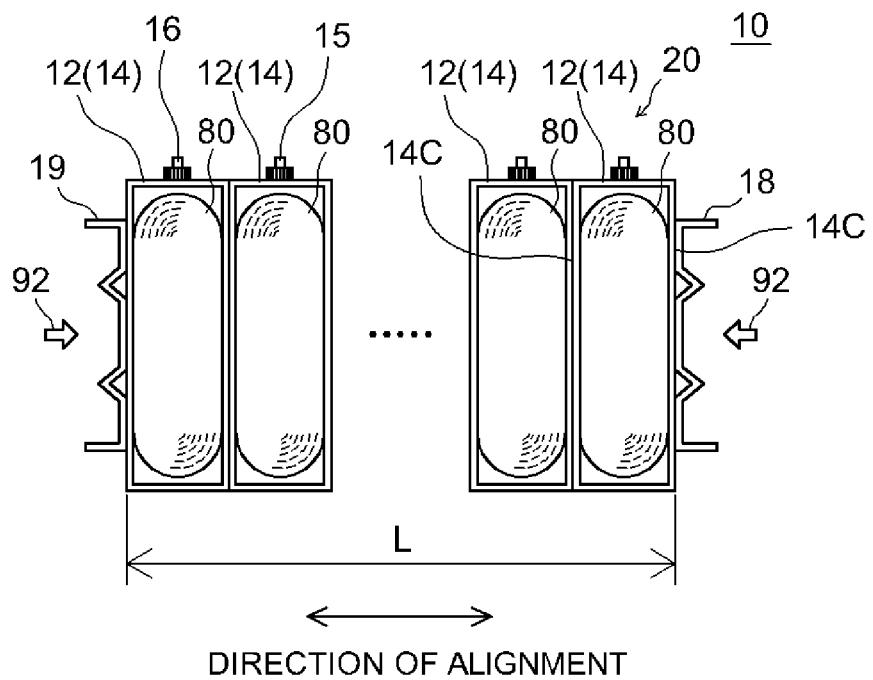
FIG. 2 is a side view schematically showing a configuration of an assembled battery according to an embodiment of the present invention.

As an example, as shown in FIGS. 1 and 2, an assembled battery 10 according to the present embodiment comprises a predetermined number (typically, 10 or more, favorably around 10 to 100, more favorably around 30 to 100 and, for example, 50) cells 12 with a same Shape. Each of the cells 12 has a container 14 with a shape (in the present embodiment, a flat box shape) capable of housing a flat-shaped wound electrode body (to be described later).

A positive electrode terminal 15 which is electrically connected to a positive electrode of the wound electrode body 80 and a negative electrode terminal 16 which is electrically connected to a negative electrode of the wound electrode body 80 are provided on an upper surface of the container 14. As illustrated, between two adjacent cells 12, the positive electrode terminal 15 of the first cell 12 and the negative electrode terminal 16 of the second cell 12 are electrically connected by a connector 17. By connecting each of the cells 12 in series in this manner, the assembled battery 10 having a desired voltage is constructed. Moreover, the containers 14 may be provided with a safety valve or the like for purging gas created inside the containers in a similar manner to conventional cell containers. Since a configuration of the container 14 itself does not characterize the present invention, a detailed description thereof will be omitted. The material of the container 14 may be similar to that used in a conventional cell and is not limited to any particular material. From the perspective of reducing weight of the assembled battery itself, for example, a battery case made of a thin metal or a synthetic resin may be used. For example, a metal container with an insulating resin-coated surface or a synthetic resin container made of a polyolefin-based resin such as polypropylene or the like is preferable. For example, the container 14 according to the present embodiment is made of aluminum.

As shown in FIGS. 1 and 2, the plurality of cells 12 with the same shape are aligned in a direction opposed by a wide surface 14C of the container 14 (in other words, a surface corresponding to a flat surface of the wound electrode body 80 (to be described later) that is housed in the container 14) by having every other cell 12 inverted so that the respective positive electrode terminals 15 and the negative electrode terminals 16 of the cells 12 are alternately arranged at constant intervals. In addition, a pair of end plates 18 and 19 is arranged on either outer side in a direction of cell alignment (direction of cell lamination). Furthermore, a constraining band 21 for tightening is attached so as to bridge both end plates 18 and 19.

In addition, the entirety of the group of cells aligned in this manner and the end plates 18 and 19 is constrained under prescribed constraint pressure 92 in the direction of alignment of the cells by the constraining band 21 for tightening which is attached so as to bridge both end plates 18 and 19. More specifically, as shown in FIG. 2, by tightening and fixing an end of the constraining band 21 to the end plate 18 using a screw 22, the cells 12 can be constrained so that predetermined constraint pressure (for example, pressure acting on a container side wall is around 5 kgf/cm$^2$ to 10 kgf/cm$^2$) is applied in the direction of alignment of the cells 12. A cell laminate 20 constrained under the prescribed constraint pressure has a prescribed length L. In other words, with the assembled battery 10, appropriate pressure is applied to each cell 12 (typically, mainly to the electrode body 80 which constitutes the cell 12) by bringing the respective cells 12 into pressure contact with each other so that the aligned group of cells (the cell laminate) 20 has the prescribed length L.

In this case, even if the constraint by tightening of the end plates 18 and 19 enables appropriate pressure to be applied to each cell 12 (typically, mainly to the electrode body 80 which constitutes the cell 12) by bringing the respective cells 12 into pressure contact with each other so that the aligned group of cells (the cell laminate) 20 has the prescribed length L at the time of manufacturing, when used over a long period of time, deterioration of constraining members or the like (the end plates 18 and 19, the constraining band 21, the screw 22, and the like) may cause a variation in the length of the cell laminate 20 and a fluctuation in the pressure applied to each cell 12 (typically, mainly to the electrode body 80 which constitutes the cell 12). In particular, since an assembled battery to be mounted in a vehicle such as an automobile (typically, an assembled battery for a vehicle-driving power source) is often used in a state where temperature varies dynamically and vibrations occur, the constraining members are more likely to deteriorate and a fluctuation in pressure is likely to occur.

In contrast, in the present embodiment, the wound electrode body 80 used in each cell 12 which is constrained by the constraining members has a spring constant in the direction of alignment (load direction) that is equal to or lower than 10,000 kg/mm.

As will be demonstrated by test examples (to be described later), the assembled battery 10 comprising the wound electrode body 80 that satisfies the condition described above (spring constant is equal to or lower than 10,000 kgf/mm) is capable of stably maintaining pressure acting on each cell 12 (typically, mainly on the wound electrode body 80 that constitutes the cell) even when deterioration of constraining members or the like causes a variation in the length of the cell laminate 20. Therefore, pressure acting on each cell 12 can be appropriately maintained even during use over a long period of time and battery performance (in particular, output characteristics) can be favorably maintained.

Figure 3:
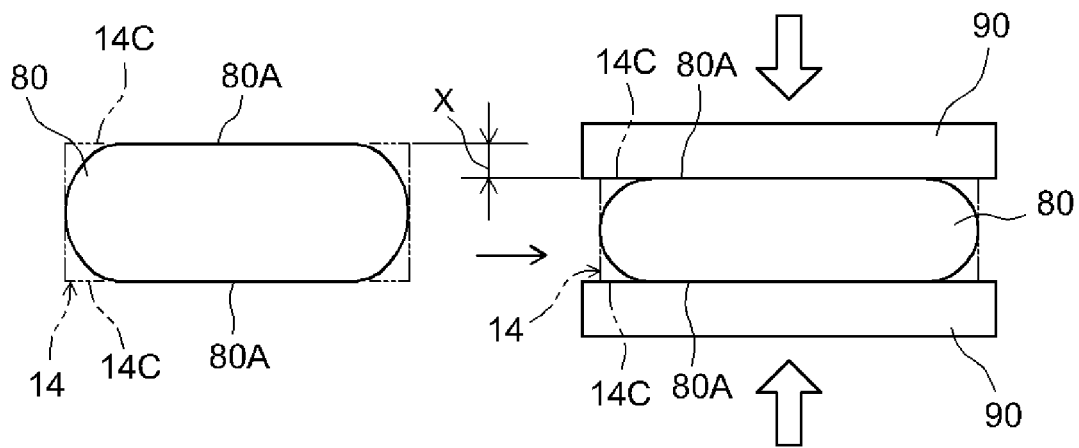
FIG. 3 is a diagram for describing a method of measuring a spring constant of an electrode body.

In this case, the spring constant of the wound electrode body 80 refers to a proportionality constant obtained by dividing a load applied to the wound electrode body 80 by displacement. For example, the spring constant can be measured using a compression tester shown in FIG. 3. First, the wound electrode body 80 is housed in the container 14, and a pair of flat plates 90 is abutted to either side of the wide surface 14C of the container 14. Subsequently, the container 14 is sandwiched in the direction of either surface by the pair of flat plates 90 and a load is applied to a flat surface 80A of the wound electrode body 80 to compress the wound electrode body 80. A relationship that exists at this point between a magnitude P of the load and displacement X is as shown in FIG. 4.

Figure 4:
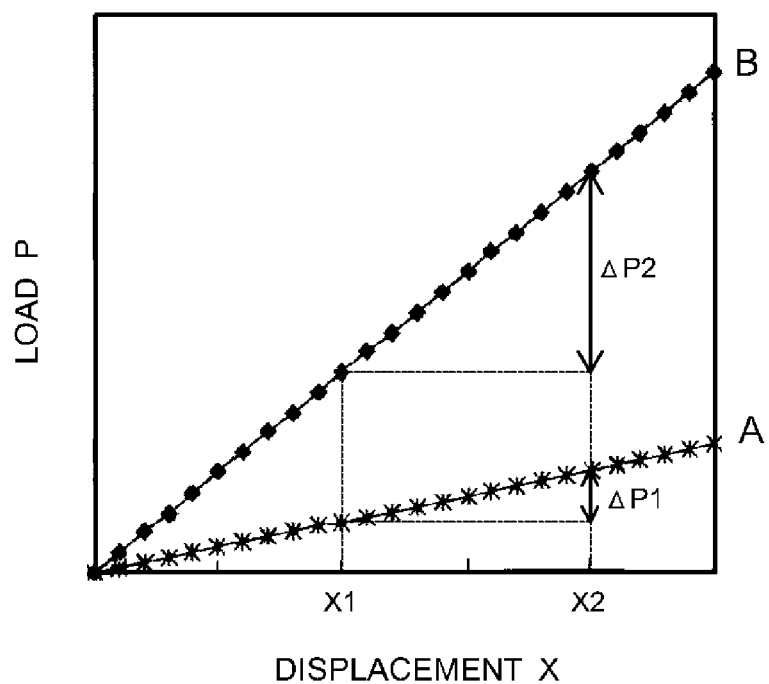
FIG. 4 is a graph showing a relationship between a displacement X and a load P.

In FIG. 4, curves A and B respectively represent relationships between the load P and the displacement X for different wound electrode bodies 80, where an abscissa represents displacement X (mm) and an ordinate represents load P (kgf). As shown in FIG. 4, as the load P applied to the wound electrode body 80 increases, the wound electrode body 80 compressively deforms in a thickness direction. The load P applied to the wound electrode body 80 and the displacement X of the wound electrode body 80 at this point are approximately proportional to each other, and an inclination thereof is approximately expressed as P/X. The inclination P/X of the curve corresponds to a spring constant k. In other words, the spring constant k is expressed by Expression (1) below and is calculated based on the load P applied to the wound electrode body 80 and the displacement X of the wound electrode body 80 at this point.

$$\text{Spring constant } k = P/X \quad (1)$$

The wound electrode body related to the curve A in FIG. 4 has a more gradual inclination and a smaller spring constant than the wound electrode body related to the curve B. In the case of a wound electrode body with a small spring constant as described above, there is less fluctuation of the load P associated with an increase/decrease (for example, X1→X2) in the displacement X (ΔP1<ΔP2). Therefore, with the assembled battery 10 comprising the wound electrode body 80, even when deterioration of constraining members or the like causes a variation in the length of the cell laminate 20 (FIG. 2), by reducing the spring constant of the wound electrode body, a fluctuation of the constraint load associated with a variation in the length of the cell laminate 20 (FIG. 2) can be suppressed and battery performance can be favorably maintained.

The spring constant of the electrode body with respect to the direction of alignment (load direction) appropriately ranges from approximately 2000 kgf/mm to 10,000 kgf/mm, favorably ranges from 2000 kgf/mm to 8000 kg/mm, and particularly favorably ranges from 2000 kgf/mm to 6000 kgf/mm. An assembled battery in which the spring constant of the electrode body exceeds 10,000 kgf/mm may not always be capable of stably maintaining pressure acting on each cell 12 (typically, mainly on the wound electrode body 80 that constitutes the cell 12) when deterioration of constraining members or the like causes a variation in the length of the cell laminate 20. On the other hand, an assembled battery in Which the spring constant of the wound electrode body is below 2000 kgf/mm is unfavorable because such an assembled battery is difficult to manufacture and reduced dimensional stability of plates (positive electrode and negative electrode) and the wound electrode body causes a decline in durability. In reality, a sufficiently preferable performance can be produced if the spring constant of the wound electrode body 80 with respect to the array direction (the load direction) 92 ranges from 5000 kgf/mm to 10,000 kgf/mm.

Figure 5:
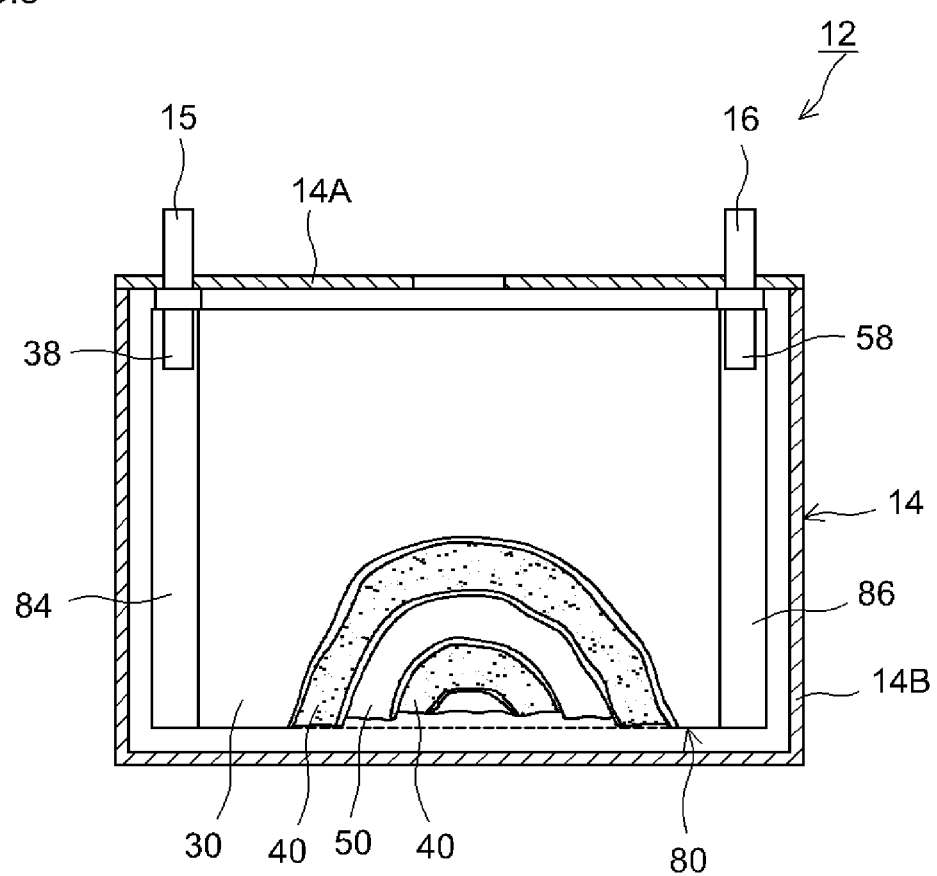
FIG. 5 is a diagram schematically Showing a configuration of a secondary battery according to an embodiment of the present invention.

Next, a configuration of the electrode body 80 housed inside the container 14 of each cell 12 and constructions of the electrode body 80 and the cell 12 which characterize the present invention will be described with reference to the schematic diagrams shown in FIGS. 5 and 6. FIG. 5 is a diagram schematically showing a configuration of the cell 12 (a cell 12 used as a component of the assembled battery 10) according to the present embodiment, and FIG. 6 is a diagram schematically showing the wound electrode body 80 according to an embodiment of the present invention.

As shown in FIG. 5, a lithium secondary battery 12 (a cell 12 used as a component of the assembled battery 10) according to the present embodiment comprises a metal container 14 (a container 14 made of resin or a laminated film is also preferable). The container 14 comprises a flat cuboid container main body 14B having an open upper end, and a lid body 14A that blocks the opening thereof. A positive electrode terminal 15 which is electrically connected to a positive electrode 30 of the wound electrode body 80 and a negative electrode terminal 16 which is electrically connected to a negative electrode 50 of the wound electrode body 80 are provided on an upper surface (in other words, the lid body 14A) of the container 14. Housed inside the container 14 is the flat-shaped wound electrode body 80 which is fabricated by, for example, laminating and winding an elongated sheet-shaped positive electrode (positive electrode sheet) 30 and an elongated sheet-shaped negative electrode (negative electrode sheet) 50 together with two elongated sheet-shaped separators (separator sheets) 40 and subsequently squashing an obtained wound body in a direction of side surfaces thereof.

Figure 6:
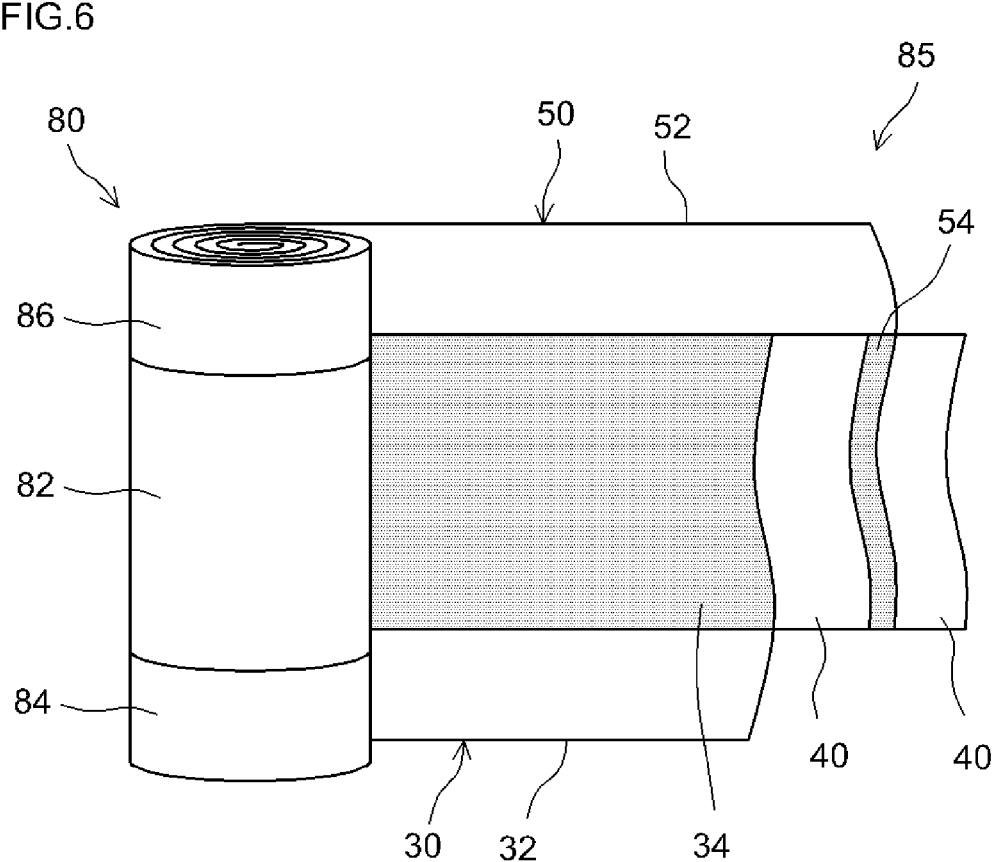
FIG. 6 is a diagram schematically showing a configuration of a wound electrode body according to an embodiment of the present invention.

As shown in FIG. 6, the wound electrode body 80 is formed by winding a sheet-like electrode body 85. The sheet-like electrode body 85 has an elongated (hand-shaped) sheet structure prior to assembly of the wound electrode body 80. In a similar manner to a typical wound electrode body, the sheet-like electrode body 85 is formed by laminating the positive electrode sheet 30 and the negative electrode sheet 50 together with two separator sheets 40.

The positive electrode sheet 30 is formed by attaching a positive electrode active material layer 34 to either surface of an elongated sheet-shaped foil-like positive electrode current collector 32. However, the positive electrode active material layer 34 is not attached to one side edge along an end side of the sheet-shaped electrode body in a width direction, and the positive electrode current collector 32 is exposed at a constant width. An aluminum foil (present embodiment) or other metallic foils suitable for a positive electrode is preferably used as the positive electrode collector 32. The positive electrode active material layer 34 is constituted by a positive electrode active material and other positive electrode active material layer-forming constituents (for example, an electrically conductive material or a binder) which are used as necessary. In addition, the positive electrode active material layer 34 is formed by applying a coating material (a positive electrode active material layer-forming composition) containing positive electrode active material layer-forming constituents and a solvent to the positive electrode current collector 32, drying the coating material, and rolling the coated positive electrode current collector 32 if necessary.

As the positive electrode active material, one or two or more materials conventionally used in a lithium secondary battery can be used without any particular limitation. Favorable application objects of the technique disclosed herein include positive electrode active materials composed mainly of an oxide that includes lithium and a transition metal element as constituent metal elements (a lithium transition metal oxide) such as lithium-manganese oxide ($LiMn_2O_4$), lithium-cobalt oxide ($LiCoO_2$), and lithium-nickel oxide ($LiNiO_2$). In particular, application to a positive electrode active material having a lithium-nickel-cobalt-manganese complex oxide (for example, $LiNi_{1/3}Co_{1/3}Mn_{1/3}O_2$) (typically, a positive electrode active material substantially made of a lithium-nickel-cobalt-manganese complex oxide) is favorable.

In this case, the term "lithium-nickel-cobalt-manganese complex oxide" is used so as to include oxides containing Li, Ni, Co, and Mn as constituent metal elements as well as oxides containing at least one metal element other than Li, Ni, Co, and Mn (in other words, a transition metal element and/or a representative metal element other than Li, Ni, Co, and Mn). For example, the metal element may be one or two or more elements selected from a group containing F, B, W, Mo, Cr, Ta, Nb, V, Zr, Ti, and Y. The same concept applies to the terms "lithium-nickel oxide", "lithium-cobalt oxide", and "lithium-manganese oxide". Favorably, the oxide may be expressed by Expression (2) below.

$$Li_{1+x}(Ni_yCo_zMn_{1-y-z}M_y)O_2 \quad (2)$$

(where M denotes one or two or more elements selected from a group containing F, B, W, Mo, Cr, Ta, Nb, V. Zr, Ti, and Y; and $0 \leq x \leq 0.2$, $0.3 \leq y \leq 1$, $0 \leq z \leq 0.6$, and $0 \leq \gamma \leq 0.3$).

As such a lithium transition metal oxide (typically, particulate), for example, a lithium transition metal oxide powder prepared by a conventionally-known method made be used without modification. For example, a lithium transition metal oxide powder substantially made up of secondary particles with an average particle diameter ranging between approximately 1 μm to 25 μm can be favorably used as the positive electrode active material.

Examples of the electrically conductive material include carbon materials such as carbon powder and carbon fibers. One material selected from these electrically conductive materials may be used alone or two or more materials may be used in combination. Examples of carbon powder that can be used include various types of carbon black (such as acetylene black, oil furnace black, graphitized carbon black, carbon black, graphite, and Ketjen black) and graphite powder.

For the binder, a polymer can be used Which is dispersible or dissolvable in a solvent used in the coating material for forming the positive electrode active material layer (the positive electrode active material layer-forming composition). For example, in a coating material (positive electrode active material layer-forming composition) that uses an aqueous solvent, a water-soluble or water-dispersible polymer can be used preferably, examples of Which include: a cellulose-based polymer (for example, polyvinyl alcohol (PVA) or poly (PTFE)) such as carboxymethyl cellulose (CMC) or hydroxypropyl methyl cellulose (HPMC); a fluorine-based resin (for example, a vinyl acetate copolymer or styrene butadiene rubber (SBR)) such as tetrafluoroethylene-hexafluoropropylene copolymer (FEP); and rubbers such as acrylic acid-modified SBR resin (SBR latex). In addition, in a coating material (positive electrode active material layer-forming composition) that uses a non-aqueous solvent, a polymer such as polyvinylidene fluoride (PVDF) or polyvinylidene chloride (PVDC) can be used preferably. The above-mentioned examples of polymer materials can also be used for the purpose of demonstrating a function as a thickener or other additive in the above-mentioned composition in addition to functioning as a binder. Any aqueous solvent or non-aqueous solvent can be used as the solvent. A preferable example of a non-aqueous solvent is N-methyl-2-pyrrolidone (NMP).

A mass ratio of the positive electrode active material in the entire positive electrode active material layer is preferably about 50% by mass or more (and typically 50 to 95% by mass), and normally the ratio is more preferably about 70 to 95% by mass (for example, 75 to 90% by mass). In addition, the ratio of the electrically conductive material in the entire positive electrode active material layer can be, for example, about 2 to 20% by mass, and normally the ratio is preferably about 5 to 15% by mass. In a composition that uses a binder, the ratio of the binder in the entire positive electrode active material layer can be, for example, about 1 to 10% by mass, and normally the ratio is preferably about 2 to 5% by mass.

In a similar manner to the positive electrode sheet 30, the negative electrode sheet 50 is also formed by attaching a negative electrode active material layer 54 to either surface of an elongated sheet-shaped foil-like negative electrode current collector 52. However, the negative electrode active material layer 54 is not attached to one side edge along an end side of the sheet-shaped electrode body in a width direction, and the negative electrode current collector 52 is exposed at a constant width. A copper foil (present embodiment) or other metallic foils suitable for a negative electrode is preferably used as the negative electrode collector 52. The negative electrode active material layer 54 is constituted by a negative electrode active material and other negative electrode active material layer-forming constituents (for example, a binder) which are used as necessary. In addition, the negative electrode active material layer 54 is formed by applying a coating material (a negative electrode active material layer-forming composition) containing negative electrode active material layer-forming constituents and a solvent to the negative electrode current collector 52, drying the coating material, and rolling the coated negative electrode current collector 52 if necessary.

As the negative electrode active material, one or two or more materials conventionally used in a lithium secondary battery can be used without any particular limitation. Examples of such materials include particulate carbon materials (carbon particles) at least partially containing a graphite structure (layered structure). More specifically, a carbon material having a so-called graphitic structure (graphite), a non-graphitizable carbonaceous structure (hard carbon), a graphitizable carbonaceous structure (soft carbon), or a combination thereof can be used. For example, graphite particles such as natural graphite can be used. Other examples include lithium-containing transition metal oxides and transition metal nitrides. A binder or an electrically conductive material similar to that used in the positive electrode active material layer can be used in the negative electrode active material layer. In addition, various polymers that function as a thickener of the coating material (the negative electrode active material layer-forming composition) may be mixed into the negative electrode active material layer.

Although there are no particular limitations thereon, the ratio of the negative electrode active material in the entire negative electrode active material layer can be about 80% by mass or more (for example, 80 to 99% by mass). Preferably, the ratio of the negative electrode active material in the entire negative electrode active material layer is about 90% by mass or more (for example, 90 to 99% by mass, and more preferably, 95 to 99% by mass). In a composition that uses a binder, the ratio of the binder in the entire negative electrode active material layer can be, for example, about 0.5 to 10% by mass, and normally the ratio is preferably about 1 to 5% by mass.

The separator sheet 40 which is a member that separates the positive electrode sheet 30 and the negative electrode sheet 50 from each other is constituted by a band-shaped sheet material which has a predetermined width and which includes a plurality of minute holes. For example, a separator which is made of a porous polyolefin-based resin and which has a single-layer structure or a laminated structure may be used as the separator 40. Moreover, there may be cases where the separator is not required when a solid electrolyte or a gel electrolyte is used as the electrolyte (in this case, the electrolyte itself can function as a separator).

When preparing the wound electrode body 80, the positive electrode sheet 30 and the negative electrode sheet 50 are laminated via the separator sheet 40. In doing so, the positive electrode sheet 30 and the negative electrode sheet 50 are overlapped slightly displaced in a width direction of the separator sheet 40 so that a positive electrode active material layer unformed section 84 of the positive electrode sheet 30 and a negative electrode active material layer unformed section 86 of the negative electrode sheet 50 respectively protrude from either side of the separator sheet 40 in the width direction. The flat-shaped wound electrode body 80 can be fabricated by winding a laminate that has been laminated in this manner and subsequently squashing an obtained wound body in a direction of side surfaces thereof.

A wound core portion 82 (that is, a portion in which the positive electrode active material layer 34 of the positive electrode sheet 30, the negative electrode active material layer 54 of the negative electrode sheet 50, and the separator sheet 40 are tightly laminated) is formed in a central portion of the wound electrode body 80 in a winding axis direction. In addition, the electrode active material layer unformed sections of the positive electrode sheet 30 and the negative electrode sheet 50 respectively protrude outward from the wound core portion 82 at either end of the wound electrode body 80 in the winding axis direction. A positive electrode lead terminal 38 and a negative electrode lead terminal 58 are respectively annexed to the positive electrode-side protruding portion (in other words, the unformed portion of the positive electrode active material layer 34) 84 and the negative electrode-side protruding portion (in other words, the unformed portion of the negative electrode active material layer 54) 86, and are respectively electrically connected to the positive electrode terminal 15 and the negative electrode terminal 16 described above.

The wound electrode body 80 configured as described above is housed in the container main body 14B so that a flat surface of the wound electrode body 80 opposes a wide surface of the container main body 14B and an appropriate nonaqueous electrolyte solution is arranged inside (introduced into) the container main body 14B. For example, the electrolyte is a lithium salt such as $LiPF_6$. For example, an appropriate amount (for example, a concentration of 1 M) of a lithium salt such as $LiPF_6$ can be dissolved in a nonaqueous electrolyte (a nonaqueous electrolyte solution) such as a mixed solvent containing diethyl carbonate and ethylene carbonate (for example, at a volume ratio of 1:1) and used as an electrolyte solution. Subsequently, by sealing the opening of the container main body 14B by welding the lid body 14A or the like to the opening, the construction of the lithium-ion secondary battery 12 (a cell 12 used as a component of the assembled battery 10) according to the present embodiment is completed. Moreover, a sealing process of the container main body 14B and an arrangement (introduction) process of the electrolyte solution can be performed in a similar manner to methods used when manufacturing a conventional battery. Subsequently, conditioning (initial charging and discharging) of the battery is performed. Processes such as degassing and quality inspecting may be performed as necessary.

While the lithium secondary battery 12 comprising the wound electrode body 80 can be constructed as described above, in the present embodiment, the used wound electrode body 80 has a spring constant that is equal to or lower than 10,000 kgf/mm.

The wound electrode body 80 satisfying the condition described above (a spring constant equal to or lower than 10,000 kgf/mm) can be realized by, for example, appropriately selecting porosity of the positive electrode active material layer 34. In other words, the spring constant of the wound electrode body 80 can be controlled by appropriately selecting the porosity of the positive electrode active material layer. The porosity of the positive electrode active material layer 34 is appropriately approximately 30% or higher, favorably 40% or higher, and more favorably 50% or higher. When the porosity is within this range, a soft positive electrode sheet 30 with superior elasticity can be produced. Therefore, the wound electrode body 80 whose spring constant is equal to or lower than 10,000 kgf/mm can be formed more appropriately.

On the other hand, simply increasing the porosity of the positive electrode active material layer 34 reduces contact between particles of the positive electrode active material and particles of the electrically conductive material, and may lower output characteristics and result in insufficient strength of the positive electrode active material layer. In order to balance elasticity with mechanical strength, the porosity of the positive electrode active material layer ranges from approximately 30% to 70%, favorably ranges from 30% to 65%, and particularly favorably ranges from 30% to 60%.

Other methods of realizing the wound electrode body 80 which satisfies the favorable spring constant condition disclosed herein includes a method of appropriately selecting a content ratio of the electrically conductive material in the positive electrode active material layer. In other words, the spring constant of the wound electrode body 80 can be controlled by appropriately selecting a content ratio of the electrically conductive material in the positive electrode active material layer. The content ratio of the electrically conductive material in the positive electrode active material layer is appropriately approximately 5% by mass or higher, favorably 6% by mass or higher, and particularly favorably 8% by mass or higher. When the content ratio is within this predetermined range, a soft positive electrode sheet 30 with superior elasticity can be produced. Therefore, the wound electrode body 80 whose spring constant is equal to or lower than 10,000 kgf/mm can be formed more appropriately. On the other hand, an excessively high content ratio of the electrically conductive material reduces an amount of active material per unit area in the positive electrode active material layer and may prevent predetermined energy density from being produced. In order to balance elasticity with energy density, the content ratio of the electrically conductive material appropriately ranges from approximately 5% by mass to 20% by mass and favorably ranges from 8% by mass to 15% by mass.

Yet other methods of realizing the wound electrode body 80 which satisfies the favorable spring constant condition disclosed herein includes a method of appropriately selecting a porosity of the negative electrode active material layer 54. In other words, the spring constant of the wound electrode body 80 can be controlled by appropriately selecting the porosity of the negative electrode active material layer 54. The porosity of the negative electrode active material layer 54 is appropriately approximately 30% or higher, favorably 40% or higher, and more favorably 50% or higher. When the porosity is within this range, a soft negative electrode sheet 50 with superior elasticity can be produced. Therefore, the wound electrode body 80 whose spring constant is equal to or lower than 10,000 kgf/mm can be formed more appropriately.

On the other hand, simply increasing the porosity of the negative electrode active material layer 54 may sometimes result in insufficient strength of the negative electrode active material layer 54. In order to balance elasticity with mechanical strength, the porosity is equal to or lower than approximately 70% (for example, 30% to 70%), favorably equal to or lower than 65% (for example, 30% to 65%), and particularly favorably equal to or lower than 60% (for example, 30% to 60%).

Still other methods of adjusting the spring constant of the wound electrode body 80 to an appropriate range includes a method of appropriately selecting a winding condition that is applied when forming the wound electrode body 80. For example, the wound electrode body 80 may be formed by winding while pulling the positive electrode sheet 30, the negative electrode sheet 50, and the two separator sheets 40. In this case, by selecting tension that is applied when winding the positive electrode sheet 30, the negative electrode sheet 50, and the two separator sheets 40, the spring constant of the wound electrode body can be controlled. In other words, by appropriately selecting tension that is applied when winding the positive electrode sheet 30, the negative electrode sheet 50, and the two separator sheets 40, the wound electrode body 80 whose spring constant satisfies 10,000 kgf/mm or lower can be more appropriately formed. The above methods of controlling the spring constant can be used either independently or in combination with one another.

Moreover, in the present specification, porosity refers to a proportion of holes in the positive electrode active material layer 34 or the negative electrode active material layer 54. For example, the "porosity of the positive electrode active material layer 34" can be ascertained by $(1-W/\rho V) \times 100$, where W denotes a mass of the positive electrode active material layer 34, V denotes an apparent volume of the positive electrode active material layer 34, and $\rho$ denotes a true density of the positive electrode active material layer 34 (a value obtained by dividing the mass W by an actual volume which does not contain holes). In addition, the porosity can also be ascertained using a mercury porosimeter.

The techniques disclosed herein provide a method of manufacturing an assembled battery comprising a secondary battery having a wound electrode body adjusted such that a spring constant thereof is equal to or lower than 10,000 kgf/mm.

The manufacturing method comprises: constructing a secondary battery having a wound electrode body adjusted such that a spring constant thereof is equal to or lower than 10,000 kgf/mm; and constructing an assembled battery by aligning and constraining a plurality of the secondary batteries in an array direction.

In this case, a wound electrode body adjusted such that a spring constant thereof is equal to or lower than 10,000 kgf/mm can be obtained by: setting formation conditions (for example, formation conditions such as tension and the like that are applied when winding the positive electrode sheet, the negative electrode sheet, and the two separator sheets) that are applied when forming constituent members that constitute the wound electrode body (for example, the porosities of the positive electrode active material layer and the negative electrode active material layer and the content ratio of the electrically conductive material) and/or the wound electrode body so that the appropriate range is realized; and forming the wound electrode body 80 according to the set conditions.

Accordingly, matters disclosed herein include a method of manufacturing a secondary battery having a wound electrode body adjusted such that a spring constant thereof is equal to or lower than 10,000 kgf/mm, the secondary battery manufacturing method comprising: setting formation conditions (for example, formation conditions such as tension and the like that are applied when winding the positive electrode sheet, the negative electrode sheet, and the two separator sheets) that are applied when forming constituent members that constitute the wound electrode body (for example, the porosities of the positive electrode active material layer and the negative electrode active material layer and the content ratio of the electrically conductive material) and/or the wound electrode body so that the appropriate range is realized; forming the wound electrode body according to the set conditions; and constructing a lithium secondary battery using the wound electrode body. A secondary battery manufactured according to the method described above can be preferably used as a component (a cell) of an assembled battery. The assembled battery provides performance suitable as an assembled battery to be mounted to a vehicle (for example, minimal performance loss even when used over a long period of time), and may have superior durability with respect to temperature variations. The secondary battery manufacturing method may also be construed as a method of adjusting the spring constant of the wound electrode body included in the secondary battery to a predetermined range (for example, to a range from 2000 kgf/mm to 10,000 kgf/mm).

In addition, the techniques disclosed herein provide a secondary battery manufacturing method including a feature of measuring (calculating) a spring constant of a wound electrode body.

The secondary battery manufacturing method comprises: forming a wound electrode body by winding a positive electrode sheet, a negative electrode sheet, and a separator sheet;

measuring (calculating) a spring constant of the wound electrode body; and judging whether or not a wound electrode bodies is a conforming item based on the measured spring constant (for example, whether or not the spring constant ranges from 2000 kgf/mm to 10,000 kgf/mm), and constructing a secondary battery using a wound electrode body judged to be a conforming item.

A secondary battery manufactured according to the method described above can be preferably used as a component (a cell) of an assembled battery. The secondary battery manufacturing method may also be construed as a method of evaluating the spring constant of the wound electrode body included in the secondary battery.

Hereinafter, the present invention will be described in greater detail based on evaluation tests. In the evaluation tests, four wound electrode bodies 80 with different spring constants were fabricated by varying porosities of the positive electrode active material layer and the negative electrode active material layer.

TEST EXAMPLE 1

Positive Electrode Sheet

In this evaluation test, active material particles having a composition represented by $Li_{1.5}Ni_{0.33}Co_{0.33}Mn_{0.33}O_2$ was used as the positive electrode active material. However, by elaborating a generation process of the active material particles, positive electrode active materials with respectively different structures were prepared by giving secondary particles of the active material particles a hollow shape or a solid shape. A hollow shape was used in Examples 1 and 2, and solid particles were used in Comparative examples 1 and 2. An average particle diameter (d50) of the secondary particles of the active material particles was set to 3 μm to 12 μm.

A positive electrode active material layer-forming composition was prepared by mixing $Li_{1.15}Ni_{0.33}Co_{0.33}Mn_{0.33}O_2$ powder as the positive electrode active material, acetylene black (AB) as an electrically conductive material, and polyvinylidene fluoride (PVdF) as a binder in N-methyl-2-pyrrolidone (NMP) so that the materials assumed a mass ratio of 87:10:3. The composition was applied in a band-shape to either surface of an elongated sheet-shaped aluminum foil with a thickness of 15 μm and subsequently dried to fabricate the positive electrode sheet 30 in which the positive electrode active material layer 34 is provided on either surface of the positive electrode collector 32. The coating amounts (application quantities) of the positive electrode active material layer-forming composition were adjusted so as to have a combined total of approximately 10 mg/cm² (based on solid content) for both sides. After drying, pressing (rolling) was performed so that the positive electrode active material layer acquired a predetermined porosity. The porosities of the positive electrode active material layers obtained in this manner are shown in Table 1. In Examples 1 and 2, since hollow portions are formed in the active material particles, holes in the positive electrode active material layers were increased due to the hollow portions and the porosities of the positive electrode active material layers exceeded 30%.

TEST EXAMPLE 2

Negative Electrode Sheet

A negative electrode active material layer-forming composition was prepared by dispersing graphite powder as a negative electrode active material, styrene butadiene rubber (SBR) as a binder, and carboxymethyl cellulose (CMC) as a thickener into water so that the materials assumed a mass ratio of 98:1:1. The negative electrode active material layer—forming composition was applied to either surface of an elongated sheet-shaped copper foil with a thickness of 10 μm (the negative electrode collector 52) to fabricate the negative electrode sheet 50 in which the negative electrode active material layer 54 is provided on either surface of the negative electrode collector 52. The coating amounts (application quantities) of the negative electrode active material layer-forming composition were adjusted so as to have a combined total of approximately 6 mg/cm² (based on solid content) for both sides. After drying, pressing (rolling) was performed so that the negative electrode active material layer acquired a predetermined porosity. The porosities of the negative electrode active material layers obtained in this manner are shown in Table 1. In Examples 1 and 2, by lowering a draft ratio of the negative electrode active material layers, holes in the negative electrode active material layers increased and the porosities of the negative electrode active material layers exceeded 30%.

TEST EXAMPLE 3

Wound Electrode Body

The positive electrode sheet 30 and the negative electrode sheet 50 obtained in Test examples 1 and 2 were wound via a separator sheet 40, and the flat-shaped wound electrode body 80 was fabricated by squashing the wound electrode body in a direction of side surfaces thereof. A 25 μm-thick separator sheet 40 made of porous polypropylene was used.

TEST EXAMPLE 4

Measurement of Spring Constant

Spring constants were measured by the method illustrated earlier in FIG. 3 for the wound electrode bodies 80 of the respective examples obtained in Test example 3. A compression tester manufactured by Shimadzu Corporation was used. Maximum load was set to 3000 kgf and load rate was set to 0.1 mm/sec. Spring constants of the wound electrode bodies 80 obtained in this manner are shown in Table 1.

TEST EXAMPLE 5

Lithium Secondary Battery

The wound electrode bodies 80 of the respective examples obtained in Test example 3 were respectively housed together with a nonaqueous electrolyte solution in a box-like battery container 14 (more specifically, an aluminum square case with dimensions of 110 mm (long side)×15 mm (short side)×90 mm (height) and a thickness of 0.5 mm throughout its entire circumference). Subsequently, the lithium secondary battery 12 was assembled by hermetically sealing an opening of the battery container 14. A nonaqueous electrolyte solution prepared by incorporating $LiPF_6$ as a supporting electrolyte at a concentration of approximately 1 mol/L into a mixed solvent containing ethylene carbonate (EC), ethyl methyl carbonate (EMC), and dimethyl carbonate (DMC) at a volume ratio of 3:4:3 was used. Subsequently, conditioning (initial charging and discharging) of the battery was performed according to a conventional method. Moreover, the lithium secondary battery 12 had a rated capacity of 5 Ah.

TEST EXAMPLE 6

Assembled Battery

Fifty lithium secondary batteries 12 were prepared for each example obtained in Test example 5, and evaluation test assembled batteries 10 were constructed by aligning the lithium secondary batteries 12 so that flat surfaces of electrode bodies oppose each other and by constraining the lithium secondary batteries 12 in an array direction (refer to FIGS. 1 and 2). In doing so, end plates 18 and 19 were arranged at either end of the aligned group of batteries (cell laminate) 20, and by tightening and fixing the end plates 18 and 19, constraint pressure of approximately 10 kg/cm² was applied to a container side wall of each cell. An interval between the end plates 18 and 19 (a length of the cell laminate 20) at this point is assumed to be a prescribed length L.

TEXT EXAMPLE 7

Measurement of 25° C. Output

25° C. output of the assembled batteries of the respective examples obtained in Text example 6 were measured, 25° C. output was obtained by the following procedures under a 25° C. temperature atmosphere.

Procedure 1: Discharging was performed up to 3 V by constant current discharge of 1 C.

Procedure 2: After charging to 4.1 V by constant current charge of 1 C, charging was performed by constant voltage charge until total charging time reached 2 hours. Accordingly, a state of charge of approximately 50% of the rated capacity was reached (SOC 50%).

Procedure 3: Paused for 5 minutes at SOC 50%.

Procedure 4: Discharging was performed at constant wattage from SOC 50%, and a discharge time until reaching 2 V was measured.

Procedure 5: Procedure 4 was repeated by varying the constant wattage condition within a range of 5 to 60 W. Discharge times until reaching 2 V as measured under the respective W conditions were plotted on an abscissa, W corresponding to the measured discharge times was plotted on an ordinate, and W at 10 seconds was calculated from an approximate curve. This was adopted as 25° C. output.

TEXT EXAMPLE 8

Measurement of −30° C. Output

−30° C. output of the assembled batteries of the respective examples obtained in Text example 6 were measured. Subsequently, values of a ratio of −30° C. output/25° C. output were relatively evaluated as values representing a decline in output due to storage of the assembled battery at −30° C. −30° C. output was obtained by the following procedures.

Procedure 1: Discharging was performed up to 3 V by constant current discharge of 1 C in a 25° C. temperature atmosphere.

Procedure 2: After charging to 4.1 V by constant current charge of 1 C in a 25° C. temperature atmosphere, charging was performed by constant voltage charge until total charging time reached 2 hours. Accordingly, a state of charge of approximately 50% of the rated capacity was reached (SOC 50%).

Procedure 3: Incubation was performed for 5 hours in a −30° C. temperature atmosphere.

Procedure 4: Discharging was performed at constant wattage from SOC 50% in a −30° C. temperature atmosphere, and a discharge time until reaching 1.5 V was measured.

Procedure 5: Procedure 4 was repeated by varying the constant wattage condition within a range of 5 to 60 W. Discharge times until reaching 1.5 V as measured under the respective W conditions were plotted on an abscissa, W corresponding to the measured discharge times was plotted on an ordinate, and W at 10 second was calculated from an approximate curve. This was adopted as −30° C. output.

Figure 7:
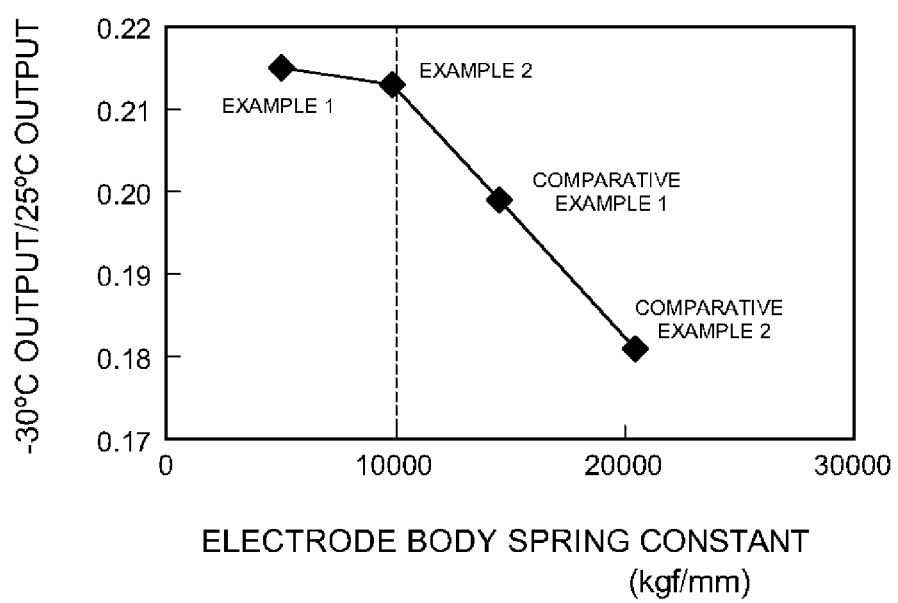
FIG. 7 is a graph showing a relationship between an electrode body spring constant and a ratio of −30° C. output to 25° C. output).

Subsequently, ratios of −30° C. output/25° C. output were relatively evaluated as values representing a decline in output due to storage of the assembled batteries of the respective examples at −30° C. The 25° C. output is that obtained in Text example 6. Results are shown in Table 1 and FIG. 7. FIG. 7 is a graph showing a relationship between an electrode body spring constant and −30° C. output/25° C. output, wherein an abscissa plots the electrode body spring constant (kgf/mm) and an ordinate plots −30° C. output/25° C. output. It is shown that the greater the value of −30° C. output 25° C. output, the smaller the decline in output due to storage at −30° C.

As is apparent from Table 1 and FIG. 7, with the assembled batteries of Comparative examples 1 and 2 having electrode body spring constants of 14,530 kgf/mm and 20,450 kgf/mm, −30° C. output/25° C. output was significantly low. This is presumably due to expansion/contraction of a constraining member due to temperature variations causing the length of the cell laminate to vary, which in turn caused a fluctuation in pressure applied to each cell. In contrast, with the assembled batteries of Examples 1 and 2 having electrode body spring constants of 9850 kgf/mm and 5020 kgf/mm, since the fluctuation in pressure attributable to the temperature variations was appropriately suppressed, −30° C. output/25° C. output improved significantly from Comparative examples 1 and 2. From these results, it was confirmed that variations in battery performance when temperature variations occur repetitively can be suppressed by setting the spring constant of the electrode body to or lower than 10,000 kgf/mm.

TABLE 1

| | Positive electrode porosity (%) | Negative electrode porosity (%) | Spring constant k (kgf/mm) | −30° C. output/25° C. output |
|---|---|---|---|---|
| Example 1 | 55 | 55 | 5020 | 0.215 |
| Example 2 | 35 | 40 | 9850 | 0.213 |
| Comparative example 1 | 25 | 30 | 14,530 | 0.199 |
| Comparative example 2 | 20 | 20 | 20,450 | 0.181 |

TEST EXAMPLE 9

Rate of Output Variation

Figure 8:
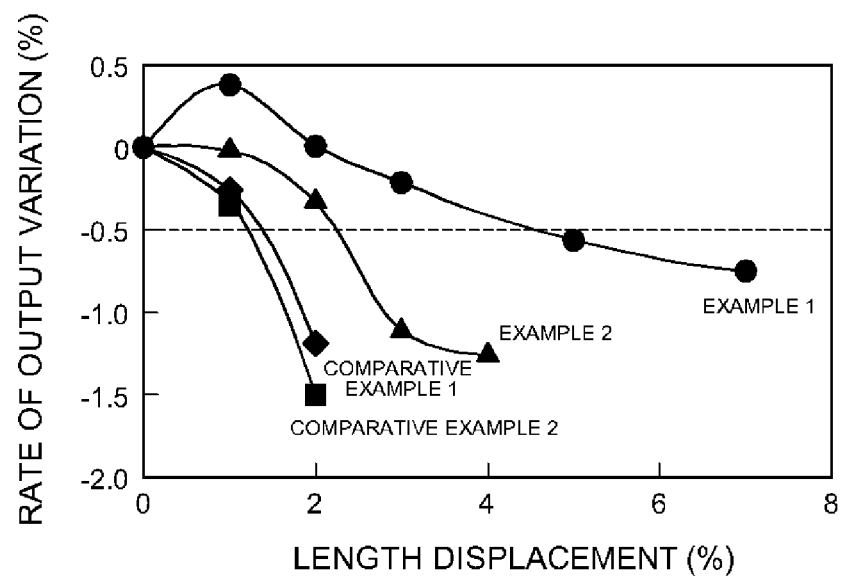
FIG. 8 is a graph showing a relationship between constraint displacement and rate of output variation.

With the assembled batteries 10 of the respective examples obtained in Text example 6, in order to simulate a fluctuation of the interval between the end plates 18 and 19 (the length of the cell laminate 20) which may occur due to vehicle vibration, temperature variation, and the like, the plate interval was set shorter than the prescribed length L. The plate interval (length) in this case is denoted by d. 25° C. output was measured according to the same procedures as Text example 6, and a rate of output variation=[(W2−W1)/W1]×100 was calculated, where "W1" represents 25° C. output at the prescribed length L and "W2" represents 25° C. output at an arbitrary length d. In this case, the 25° C. output at the prescribed length L is that obtained in Text example 6. Results are shown in Table 2 and FIG. 8. FIG. 8 is a graph showing a relationship between length displacement and rate of output variation, wherein an abscissa plots length displacement and an ordinate plots rate of output variation. In this case, the length displacement is calculated by [(L−d)/L]×100, where L denotes the prescribed length and d denotes an arbitrary length.

TABLE 2

| | Spring constant k (kgf/mm) | Length displacement (%) | Rate of output variation (%) | Output (W) | Resistance |
|---|---|---|---|---|---|
| Example 1 | 5020 | 0 | 0.00 | 316.6 | 3.158105 |
| | | 1 | 0.38 | 317.8 | 3.146225 |
| | | 2 | 0.01 | 316.6 | 3.158105 |
| | | 3 | −0.21 | 315.9 | 3.165201 |
| | | 5 | −0.56 | 314.8 | 3.176165 |
| | | 7 | −0.75 | 314.3 | 3.182165 |
| Example 2 | 9850 | 0 | 0.00 | 316.6 | 3.158105 |
| | | 1 | −0.02 | 316.6 | 3.158105 |
| | | 2 | −0.33 | 315.5 | 3.169201 |
| | | 3 | −1.11 | 313.1 | 3.194165 |
| | | 4 | −1.26 | 312.6 | 3.199153 |
| Comparative example 1 | 14,530 | 0 | 0.00 | 316.6 | 3.158105 |
| | | 1 | −0.26 | 315.8 | 3.166201 |
| | | 2 | −1.19 | 312.9 | 3.196165 |
| Comparative example 2 | 20,450 | 0 | 0.00 | 316.6 | 3.158105 |
| | | 1 | −0.35 | 315.5 | 3.169201 |
| | | 0 | −1.50 | 311.9 | 3.206153 |

As is apparent from Table 2 and FIG. 8, the smaller the spring constant of the electrode body, the greater the suppression of output variation (decline) when the interval between the end plates was varied from the prescribed length L. In particular, with the assembled battery according to Example 1 having a spring constant of 5020 kgf/mm, there was hardly any output variation even if the length displacement was increased to 7% and output variation was effectively suppressed. These results show that the spring constant of the electrode body is appropriately set to or lower than 10,000 kgf/mm (Examples 1 and 2), favorably set to or lower than 8000 kgf/mm, and more favorably set to or lower than 6000 kgf/mm (Example 1). Moreover, in Example 1, in an order of length displacements of 0%, 1%, 2%, 3%, 5%, and 7%, the pressure applied to each cell fluctuated to 10 kgf/cm$^2$, 20 kgf/cm$^2$, 30 kgf/cm$^2$, 40 kgf/cm$^2$, 60 kgf/cm$^2$, and 80 kgf/cm$^2$. In addition, in Example 2, in an order of length displacements of 0%, 1%, 2%, 3%, and 4%, the pressure applied to each cell fluctuated to 10 kgf/cm$^2$, 30 kgf/cm$^2$, 50 kgf/cm$^2$, 70 kgf/cm$^2$, and 90 kgf/cm$^2$. Furthermore, in Comparative example 1, in an order of length displacements of 0%, 1%, and 2%, the pressure applied to each cell fluctuated to 10 kgf/cm$^2$, 40 kgf/cm$^2$, and 70 kgf/cm$^2$. In addition, in Comparative example 2, in an order of length displacements of 0%, 1%, and 2%, the pressure applied to each cell fluctuated to 10 kgf/cm$^2$, 50 kgf/cm$^2$, and 90 kgf/cm$^2$. Based on these results, it was confirmed that the smaller the spring constant of an electrode body, the smaller the fluctuation in pressure due to length displacement. With the assembled batteries under test, desirably, the spring constant of the electrode body is set to or lower than 10,000 kgf/mm and the pressure applied to each cell is set to within a range of 10 kgf/cm$^2$ to 100 kgf/cm$^2$ (favorably 10 kgf/cm$^2$ to 80 kgf/cm$^2$, and more favorably 10 kgf/cm$^2$ to 50 kgf/cm$^2$).

Moreover, as described earlier, increasing the porosity of the positive electrode active material layer 34 is effective when setting the spring constant of the electrode body to or lower than 10,000 kgf/mm. However, with a positive electrode active material made up of solid particles, there is a limit in increasing the porosity of the positive electrode active material layer 34. Therefore, in order to increase the porosity of the positive electrode active material layer 34, it is important to select a suitable positive electrode active material.

Therefore, the present inventors considered selecting a positive electrode active material which itself has holes and which improves the porosity of the positive electrode active material layer 34. As the positive electrode active material, although not shown, for example, particles of the positive electrode active material may be granulated by spray-drying to obtain a particulate structure having minute holes inside. The porosity of the positive electrode active material layer 34 can also be improved by using such a positive electrode active material.

Figure 9:
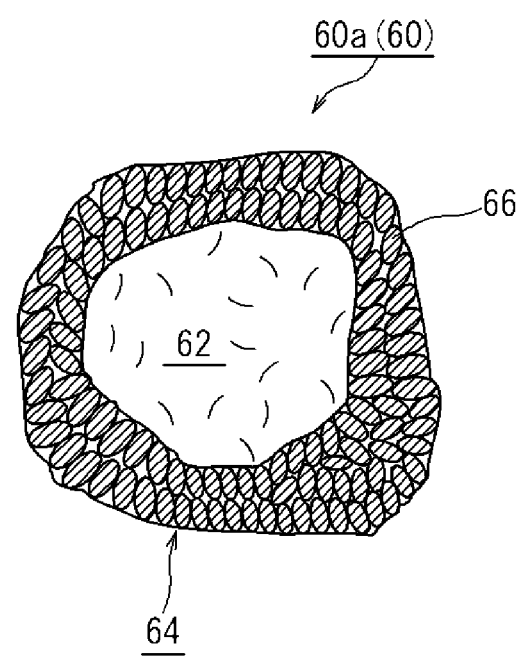
FIG. 9 is a diagram schematically showing a configuration of a positive electrode active material according to an embodiment of the present invention.

For example, as shown in FIG. 9, the positive electrode active material may be formed of secondary particles 64 resulting from the aggregation of a plurality of primary particles 66 of a lithium transition metal oxide. In this case, for example, a positive electrode active material 60a may be used in which a hollow portion 62 is formed in the secondary particles 64. According to this positive electrode active material 60a, since the hollow portion 62 is formed in the secondary particles 64, the holes inside the positive electrode active material layer 34 are increased by the hollow portion 62 and the porosity of the positive electrode active material layer 34 can be increased. Furthermore, in the mode shown in FIG. 9, a large number of micropores too minute to be illustratable are desirably formed between primary particles 66 in the secondary particles 64 to realize a configuration which enables an electrolyte solution to penetrate into the hollow portion 62. Accordingly, since the primary particles 66 can also be utilized inside the hollow portion 62, the output characteristics of the battery can be improved. Hereinafter, a structure of the positive electrode active material 60a having such a hollow portion 62 will be referred to as a "hollow structure" when appropriate.

Figure 10:
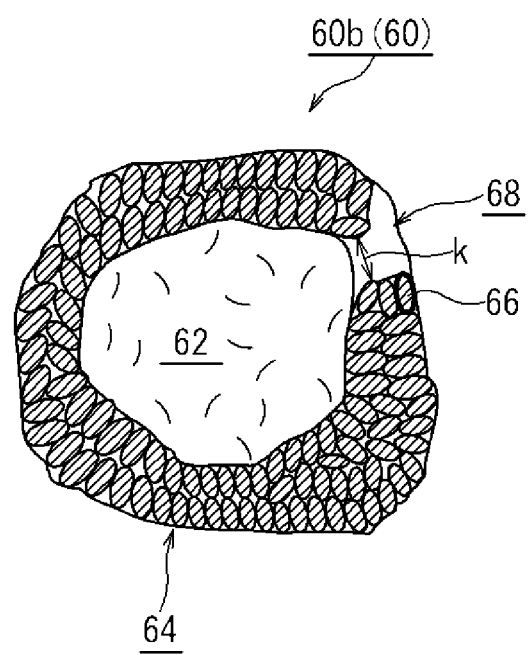
FIG. 10 is a diagram schematically showing a configuration of a positive electrode active material according to an embodiment of the present invention.

In addition, as another mode, for example, a positive electrode active material 60b may further have through holes 68 that penetrate the secondary particles 64 so as to connect the hollow portion 62 to the outside as shown in FIG. 10. Hereinafter, a structure of the positive electrode active material 60b having such through holes 68 will be referred to as a "holed hollow structure" when appropriate.

Due to the positive electrode active material W1, an electrolyte solution is able to migrate more easily between the hollow portion 62 and the outside through the through holes 68 and the electrolyte solution in the hollow portion 62 is appropriately replaced. Therefore, a depletion that is a Shortage of the electrolyte solution is less likely to occur inside the hollow portion 62. As a result, the primary particles 66 of the positive electrode active material 60b are more actively utilized inside the hollow portion 62. Accordingly, the output of the battery can be further improved.

In this case, an average opening width k of the through holes 68 is favorably 0.01 μm or more. Accordingly, the electrolyte solution more reliably penetrates into the hollow portion 62 and the effects described above can be more readily obtained. In addition, the average opening width k of the through holes 68 is favorably 2.0 μm or less. In this case, the opening width k of the through hole 68 refers to a length extending across a narrowest portion of the through hole 68 (an inner diameter of the through hole 68) among a path extending to the hollow portion 62 from the outside of the active material particles through the secondary particles. Moreover, when there are a plurality of through holes 68 in the hollow portion 62, an evaluation may be performed with the through hole 68 having the greatest opening width k among the plurality of through holes 68. Furthermore, the average opening width k of the through holes 68 may be 2.0 μm or less, favorably 1.0 μm or less, and more favorably 0.5 μm or less.

In addition, the average number of through holes 68 per one particle of the positive electrode active material 60b may be around 1 to 20 and more favorably around 1 to 5. According to the positive electrode active material 60b structured as described above, preferable battery performance can be produced in a more stable manner. Moreover, the number of through holes 68 in the positive electrode active material 60b with the holed hollow structure may be obtained by, for example, ascertaining the number of through holes per particle for at least 10 or more arbitrarily selected active material particles and then determining an arithmetic average thereof. A method of manufacturing the positive electrode active material 60b with this holed hollow structure may include, for example, a raw material hydroxide formation step, a mixing step, and a firing step.

In this case, the raw material hydroxide formation step is a step of supplying ammonium ions to an aqueous solution of a transition metal compound and precipitating particles of a transition metal hydroxide from the aqueous solution. The aqueous solution favorably contains at least one transition metal element that constitutes the lithium transition metal oxide. In addition, the raw material hydroxide formation step favorably includes a nucleation stage in which a transition metal hydroxide is precipitated from the aqueous solution at pH 12 or higher and at an ammonium ion concentration of 25 g/L or less and a particle growth stage in which the precipitated transition metal hydroxide is grown at a pH less than 12 and at an ammonium ion concentration of 3 g/L or more.

Furthermore, the mixing step is a step of mixing particles of the transition metal hydroxide obtained in the raw material hydroxide formation step with a lithium compound to prepare an unfired mixture. Moreover, the firing step is a step of firing the mixture obtained in the mixing step to obtain active material particles. According to this manufacturing method, the positive electrode active material 60b having a holed hollow structure can be suitably manufactured.

In addition, in this case, the firing step may be carried out such that a maximum firing temperature ranges from 800° C. to 1100° C. As a result, since the primary particles can be adequately sintered, active material particles having a desired average hardness can be preferably manufactured. This firing step is preferably carried out so that, for example, secondary particles are formed in which gaps are substantially absent from the grain boundaries of the primary particles at portions other than the hollow portion 62 and the through holes 68.

Furthermore, the firing step may include a first firing stage in which the mixture is fired at a temperature T1 of 700° C. to 900° C. and a second firing stage in which the result of the first firing stage is fired at a temperature T2 of 800° C. to 1100° C. that is higher than the firing temperature T1 of the first firing stage.

In a preferable aspect of the active material particle manufacturing method disclosed herein, the firing step includes: a first firing stage in which the mixture is fired at a temperature T1 of 700° C. to 900° C.; and a second firing stage in which the result of the first firing stage is fired at a temperature T2 of 800° C. to 1100° C. that is higher than the firing temperature T1 of the first firing stage. As a result of firing the mixture according to an aspect that includes these first and second firing stages, preferable active material particles having the favorable holed hollow structure disclosed herein can be suitably manufactured. In addition, for example, by suitably elaborating the firing step, the positive electrode active material 60a with a "hollow structure" such as that shown in FIG. 9 can be obtained by a similar method.

Furthermore, a BET specific surface area of the positive electrode active material 60 favorably ranges from 0.5 to 1.9 m$^2$/g. The positive electrode active material 60 satisfying the requirement regarding BET specific surface area described above can be used in a positive electrode of a lithium secondary battery and is capable of yielding a battery that stably demonstrates higher performance. For example, a lithium secondary battery can be constructed which has low internal resistance (or in other words, favorable output characteristics) and which demonstrates little increase in internal resistance attributable to charge-discharge cycling (particularly, charge-discharge cycling that includes high-rate discharge).

The positive electrode active material 60a with the "hollow structure" and the positive electrode active material 60b with the "holed hollow structure" described above may be adopted as preferable modes of the positive electrode active material 60 whose BET specific surface area ranges from 0.5 to 1.9 m$^2$/g.

In addition, the positive electrode active material 60a having a hollow structure and the positive electrode active material 60b having a holed hollow structure may be a lithium transition metal oxide which has a layered structure and which contains nickel as a structural element. Furthermore, the positive electrode active material 60a having a hollow structure and the positive electrode active material 60b having a holed hollow structure may be a lithium transition metal oxide which has a layered structure and which contains nickel, cobalt, and manganese as structural elements.

In addition, for example, the positive electrode active material 60a having a hollow structure and the positive electrode active material 60b having a holed hollow structure favorably have an average particle diameter which ranges from approximately 3 μm to 10 μm. Furthermore, an average opening size of the through holes 68 of the positive electrode active material 60b having a holed hollow structure is favorably ½ or less of the average particle diameter of the positive electrode active material 60b. Since the average opening size lies within a suitable range, the positive electrode active material 60b is able to easily secure a desired average hardness while suitably demonstrating effects of improving battery performance (such as an effect of reducing internal resistance) as a result of having a holed hollow structure. Thus, favorable battery performance can be demonstrated in a more stable manner.

In addition, with the positive electrode active material 60a having a hollow structure and the positive electrode active material 60b having a holed hollow structure, since the hollow portion 62 is formed in the secondary particles 64, the holes inside the positive electrode active material layer 34 are increased by the hollow portion 62 and the porosity of the positive electrode active material layer 34 can be increased. Therefore, a positive electrode sheet can expand/contract more readily and a wound electrode body whose spring constant is equal to or lower than 10,000 kgf/mm can be readily formed.

Although an example of an appropriate positive electrode active material has been presented above as the positive electrode active material contained in the positive electrode active material layer 34 of the lithium secondary battery 12, a positive electrode active material of the lithium secondary battery 12 according to the present invention is not limited to the example described above. In addition, besides the example described above, porous secondary particles which are obtained by granulating primary particles by spray-drying and which has minute holes inside may be adopted as the positive electrode active material.

While the present invention has been described in its preferred embodiment, it is to be understood that the present invention is not limited to such descriptions and that various modifications can obviously be made thereto.

Moreover, since any one of the assembled batteries 10 disclosed herein is capable of stably maintaining pressure that acts on each cell even when used in a state where temperature varies dynamically and vibrations occur, performance that is suitable as an assembled battery to be mounted in a vehicle can be produced. Therefore, according to the present invention, as shown in FIG. 11, a vehicle 1 comprising any of the assembled batteries 10 disclosed herein is provided. In particular, a vehicle 1 (for example, an automobile) comprising the assembly battery 10 as a power source (typically, a power source of a hybrid vehicle or an electric vehicle) is provided.

Furthermore, examples of favorable, application objects of the techniques disclosed herein include: an assembled battery mounted with a secondary battery envisioned to be possibly used in a charge-discharge cycle which include high-rate charges/discharges at 50 A or higher (for example, 50 A to 250 A) and further at 100 A or higher (for example, 100 A to 200 A); and an assembled battery mounted with a high-capacity secondary battery having a theoretical capacity of 1 Ah or greater (further, 3 Ah or greater) which is expected to be used in a charge-discharge cycle which includes high-rate charges/discharges at 10 C or higher (for example, 10 C to 50 C) and further at 20 C or higher (for example, 20 C to 40 C).

INDUSTRIAL APPLICABILITY

The configuration of the present invention can provide an assembled battery capable of stably maintaining pressure acting on each cell (typically, mainly on an electrode body that constitutes the cell) and a battery Which may be mounted to the assembled battery.

The invention claimed is:

1. An assembled battery comprising:
a plurality of cells, the plurality of cells being chargeable and dischargeable and being connected in series, each cell including a flat-shaped electrode body which has a positive electrode and a negative electrode and a container which houses the electrode body and an electrolyte, wherein
the plurality of cells are constrained in a state where the cells are aligned so that flat surfaces of the electrode bodies oppose each other and a load is applied to the cells in an array direction, and
a spring constant k of the electrode body in the array direction in each of the constrained cells is 2,000 kgf/mm or more and 10,000 kgf/mm or less, the spring constant k being represented by the following expression (1)

$$k \text{ (kgf/mm)} = P\text{(kgf)}/X \text{ (mm)} \quad (1)$$

where X is a displacement due to compression that occurs when a load P is applied to a flat surface of the electrode body, and
the assembled battery is configured to maintain a pressure applied to each of the electrode bodies even when the load is changed.

2. The assembled battery according to claim 1, wherein the electrode body comprises a positive electrode comprising a positive electrode active material layer including a positive electrode active material and a positive electrode current collector, and the positive electrode active material layer has a porosity of 30% to 60%.

3. The assembled battery according to claim 2, wherein the positive electrode active material has secondary particles formed by an aggregation of a plurality of primary particles of a lithium transition metal oxide, and a hollow portion formed in the secondary particles.

4. The assembled battery according to claim 2, wherein the positive electrode active material is a lithium transition metal oxide which has a layered structure and which contains nickel, cobalt and manganese as structural elements.

5. The assembled battery according to claim 2, wherein the positive electrode active material layer includes an electrically conductive material, and a content ratio of the electrically conductive material in the positive electrode active material layer is equal to or higher than 8% by mass.

6. The assembled battery according to claim 1, wherein the electrode body comprises a negative electrode comprising a negative electrode active material layer including a negative electrode active material and a negative electrode current collector, and the negative electrode active material layer has a porosity of 30% to 60%.

7. The assembled battery according to claim 1, wherein the electrode body is a flat-shaped wound electrode body comprising:

a positive electrode in which a positive electrode active material layer is added to an elongated sheet-shaped positive electrode current collector and a negative electrode in which a negative electrode active material layer is added to an elongated sheet-shaped negative electrode current collector wherein the positive electrode and the negative electrode are wound together with separators.

8. A secondary battery comprising a flat-shaped electrode body to which a constraint load is applied from outside of a battery container, wherein a spring constant of the electrode body in a load direction is 2,000 kgf/mm or more and equal to or lower than 10,000 kgf/mm, the spring constant k being represented by the following expression (1)

$$k \text{ (kgf/mm)} = P\text{(kgf)}/X \text{ (mm)} \qquad (1)$$

where X is a displacement due to compression that occurs when a load P is applied to a flat surface of the electrode body.

9. The secondary battery according to claim 8, wherein the electrode body comprises a positive electrode comprising a positive electrode active material layer including a positive electrode active material and a positive electrode current collector, and the positive electrode active material layer has a porosity of 30% to 60%.

10. The secondary battery according to claim 9, wherein the positive electrode active material has secondary particles formed by an aggregation of a plurality of primary particles of a lithium transition metal oxide, and a hollow portion formed in the secondary particles.

11. The secondary battery according to claim 9, wherein the positive electrode active material is a lithium transition metal oxide which has a layered structure and which contains nickel, cobalt and manganese as structural elements.

12. The secondary battery according to claim 9, wherein the positive electrode active material layer includes an electrically conductive material, and a content ratio of the electrically conductive material in the positive electrode active material layer is equal to or higher than 8% by mass.

13. The secondary battery according to claim 8, wherein the electrode body comprises a negative electrode comprising a negative electrode active material layer including a negative electrode active material and a negative electrode current collector, and the negative electrode active material layer has a porosity of 30% to 60%.

14. An assembled battery comprising a plurality of the secondary batteries according to claim 8 connected in series.

15. The assembled battery according to claim 1, wherein the spring constant of the electrode body in the array direction in each of the constrained cells is 5,000 kgf/mm or more.

* * * * *